Dec. 29, 1959 A. F. MESTRE 2,919,434
MAGNETIC CORE TEMPERATURE REGULATION
Filed May 29, 1958
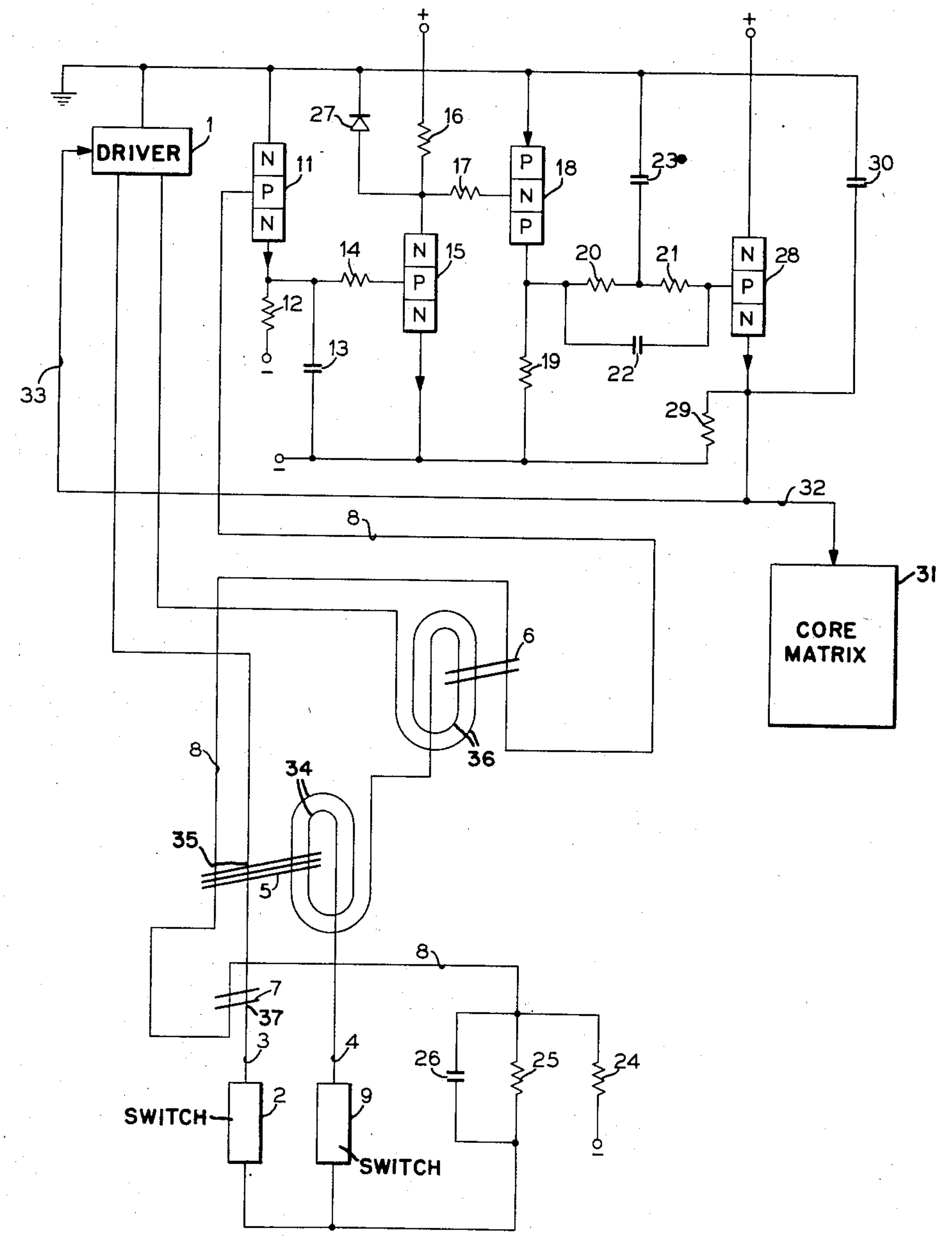
INVENTOR.
AUGUSTE F. MESTRE
BY John P. Doirty
ATTORNEY 2,919,434
Patented Dec. 29, 1959

2,919,434

MAGNETIC CORE TEMPERATURE REGULATION

Auguste F. Mestre, Creteil, France, assignor to International Business Machines Corporation, New York, N.Y., a corporation of New York Application May 29, 1958, Serial No. 738,830
9 Claims. (Cl. 340—174)

This invention relates to temperature regulation of drive pulses for controlling magnetic cores, assembled for example, to make up a data recording or storage matrix.

It is well known that, for recording or reading data from a core storage array through the superposition of two half currents, there is a maximum value for half currents. This value corresponds to the highest current which, when applied alone to a core, leaves it in its initial state, a small increase being sufficient to change the state of the core. A maximum half current applied to the core brings it into a magnetic state located just below the knee of the hysteresis curve.

It is also well known that, when the temperature of a magnetic material increases, its hysteresis cycle shrinks. Consequently, the maximum half current decreases when the temperature increases. In order to continue operating the storage matrix under proper conditions, one solution is to install the matrix in a constant temperature chamber. This solution presents the disadvantage of being costly.

Another solution is to exercise a regulation based on the direct action of the temperature on a thermistor. But, neither the response of a thermistor nor the variations of the hysteresis cycle in relation to the temperature is linear. Consequently, the regulation could be effective only in certain points, remaining approximate in-between.

An object of this invention is to provide improved means for regulating driving pulses for writing into or reading data out of a magnetic core storage.

In a preferred embodiment of this invention, a group of auxiliary magnetic cores having no recording duty are distributed among the matrix cores in order to be at the same temperature as the matrix. The windings of the auxiliary cores are energized by a test current so that the output voltage of a sense line belonging to these cores directly depends on the temperature. Electronic circuits are provided in which the sense line current produced generates a regulation voltage related to the temperature and said voltage is used to regulate the currents coming from the driver for writing and reading the matrix cores and the auxiliary cores.

Another object of this invention is to provide improved means for compensating temperature fluctuations in a magnetic core storage array.

Another object is to provide improved means for altering drive currents for a storage array in accordance with temperature changes.

Other objects of the invention will be pointed out in the following description and claims and illustrated in the accompanying drawings, which disclose, by way of examples, the principle of the invention and the best mode, which has been contemplated, of applying that principle.

In the drawing:

The figure shows the regulation circuits as a whole. The device comprises several auxiliary cores distributed in a matrix of other cores 31 so as to be at the same temperature as the matrix. These auxiliary cores, which have no recording duty, are energized by a driver 1 specially provided for this purpose. This device has a different adjustment than the drivers which energize the other cores of matrix 31.

Two switches, indicated at 2 and 9 send a writing half current and a reading current respectively to wires 3 and 4. This current has the function of causing the auxiliary cores to produce a response in accordance with their temperature.

In order to obtain the required signal in the sense line 8 of the auxiliary cores, a current slightly greater than the maximum half current is supplied the writing half current. Thus, the core tends to switch from one state to the other. It is only in this adjustment of the current that the auxiliary core driver differs from the matrix core driver.

The auxiliary cores are divided into three groups indicated as 5, 6, 7. The cores of group 5 are threaded by two reading half current windings 34 and a writing half current winding 35. The cores of group 6 are threaded by two reading half current windings 36 and the cores of group 7 by a writing half current winding 37. The sense line 8 goes through the cores in such directions that the outputs on sense line 8, due to the writing currents, cancel out and only the output produced by the reading current remains. Further, in accordance with the preferred embodiment, the direction of winding of the reading wire is such that the pulses are positive.

These pulses are applied to the base of a transistor 11 biased through a bridge of resistors 24 and 25 and by-pass condenser 26. In the emitter of transistor 11 there are a resistor 12 and a capacitor 13 which operate as a peak detector so that the voltage applied through resistor 14 to transistor 15 is no more than slightly undulated. To the collector of transistor 15 are wired a resistor 16 and a diode 27 having its other electrode grounded, in order to protect the transistor when there is no signal. The voltage at the terminals of resistor 16 is applied through resistor 17 to transistor 18. The point common to the collector of transistor 18 and a resistor 19 is wired to a bridged T filter made up of two resistors 20 and 21 in parallel with a capacitor 22, the point common to the two resistors being connected to ground through a capacitance 23. This filter serves the purpose of keeping the system from oscillating. The output voltage of the filter is applied to the base of an emitter follower 28. In the emitter circuit there are a resistor 29 and a capacitance 30, the latter is used as a filter in order to eliminate voltage undulations. The layout of the components of the whole circuit is such that, if the magnitude of the auxiliary ferrite sense line pulses increases, the output voltage of transistor 28 increases as well. Other tube or transistor circuits producing a D.C. voltage related to the pulse amplitude, from the auxiliary core sense line output pulses, might also be suitable.

A D.C. voltage whose level is a function of the matrix core temperature is available at the emitter of transistor 28. This voltage is used to adjust the amplitude of the reading or writing pulses of the matrix driver and the auxiliary core driver. In particular, the voltage is fed over line 32 to the drivers of the core storage array 31 and over line 33 to driver 1. The core groups 5, 6 and 7 are physically incorporated in the array 31 and thus assume the same temperature as the core array 31. The voltage from emitter follower 28 may be used in any well known manner to bias the drivers of array 31 to control their output currents. This voltage may constitute the bias determining the delay of the driver feedback shown in Figs. 1 and 7 of my copending application Serial No. 646,892, filed March 18, 1957, for Pulse Generator.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a magnetic core array wherein driver circuits control the cores of said array to enter data therein and read data therefrom, the combination with said core array comprising an auxiliary magnetic core physically disposed in said array, auxiliary driver circuit means for driving said auxiliary core to produce an output, and means responsive to said output for regulating said driver circuits and said auxiliary driver circuit means.

2. Apparatus for compensatng temperature changes in a magnetic core array of the type driven by driving means to control the cores of said array for entering data therein and reading data therefrom comprising in combination with said magnetic core array, an auxiliary magnetic core physically disposed in said array, means for driving said auxiliary core to produce outputs, and means responsive to said outputs for regulating the driving means for both said core array and said auxiliary core.

3. Apparatus for compensating temperature changes in a magnetic core array of the type driven by driving means to control the cores of said array for entering data therein and reading data therefrom, comprising in combination with said magnetic core array, a plurality of auxiliary magnetic cores interspersed among the cores of said array to thereby assume the same temperature as the cores of said array, means for driving said auxiliary cores to produce outputs, and means responsive to said outputs for regulating the driving means for both said core array and said auxiliary cores.

4. Apparatus according to claim 3 wherein said regulating means comprise means for producing a direct current potential related to the amplitude of said outputs.

5. Apparatus for compensating temperature changes in a magnetic core storage array of the type having driving means to control the cores of said array for entering data therein and reading data therefrom, comprising in combination with said core array, a plurality of auxiliary magnetic cores disposed among the cores of said array to assume the temperature of the cores of said array, means for driving said auxiliary cores, means responsive to changes of flux in said auxiliary cores for producing output pulses, and means responsive to the amplitude of said output pulses for regulating the driving means for both said core array and said auxiliary cores.

6. Apparatus according to claim 5 wherein said regulating means comprises means for producing a direct current potential related to the amplitude of said output pulses.

7. Apparatus according to claim 5 wherein said means for producing output pulses comprises a sense winding threading said auxiliary cores.

8. Apparatus according to claim 7 wherein said regulating means comprises a transistor amplifier and filter circuit for producing a direct current potential related to the amplitude of said output pulses.

9. Apparatus according to claim 8 wherein said regulating means regulates the current supplied from said driving means to said cores.

No references cited.